William L. Adams
INVENTOR.

BY G. Henry Peterson
AGENT

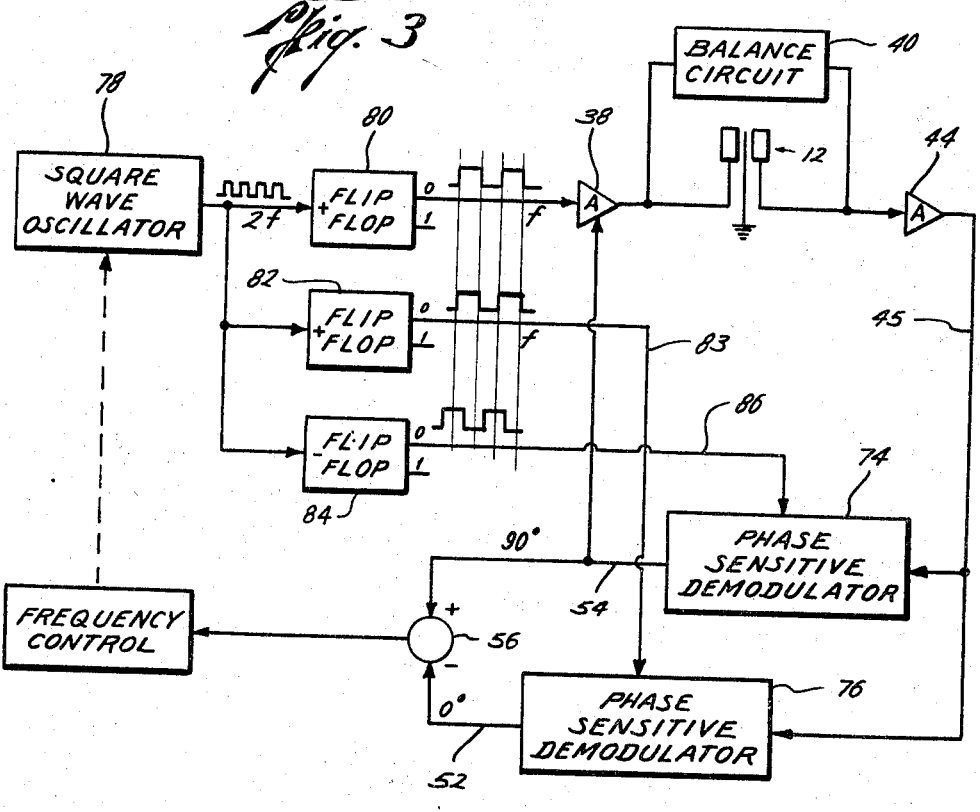
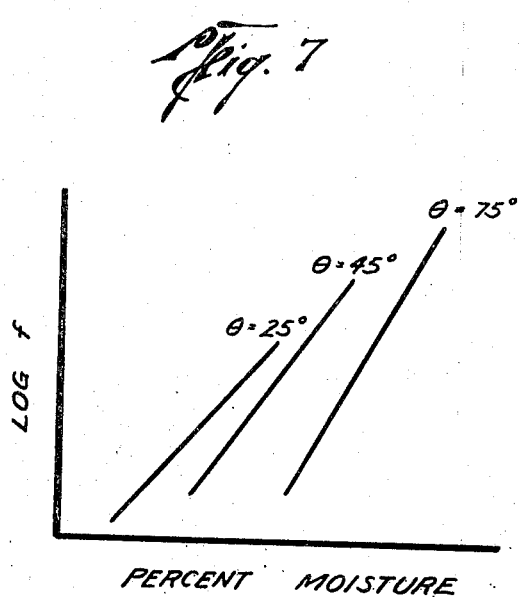
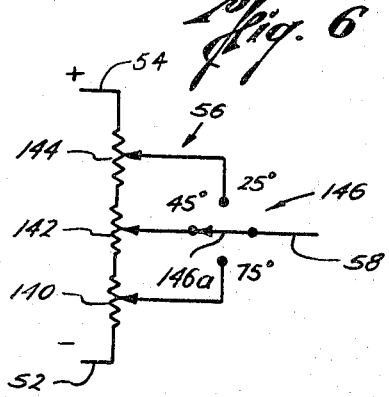
William L. Adams
INVENTOR

William L. Adams
INVENTOR.

BY

AGENT

United States Patent Office 3,443,219
Patented May 6, 1969

3,443,219
DIELECTRIC MATERIALS GAUGING SYSTEM WITH INPUT SIGNAL FREQUENCY AUTOMATICALLY VARIABLE IN RESPONSE TO DETECTED SIGNAL PHASE SHIFT VARIATION
William L. Adams, Dublin, Ohio, assignor to Industrial Nucleonics Corporation, a corporation of Ohio
Filed July 7, 1966, Ser. No. 563,487
Int. Cl. G01r 27/26
U.S. Cl. 324—61          17 Claims

ABSTRACT OF THE DISCLOSURE

Specifically disclosed is a method and apparatus for measuring a variable property (such as percentage moisture content) of a dielectric material (such as a traveling paper sheet) using a "capacitance" probe having spaced electrodes energized with a radiofrequency voltage. An optimum value, such as 45°, of the phase angle between the applied radiofrequency voltage and the complex current through the probe is selected. A departure from this selected phase angle as a result of a change in moisture content is detected, and the frequency of the applied voltage is automatically and continuously readjusted via a null-seeking servo system to maintain the phase angle constant at the selected value. The instantaneous operating frequency provides the measure of the percentage moisture content.

---

This invention relates to a system for determining a variable property of a dielectric material using a probe having spaced electrodes energized by an alternating current input signal and electrically coupled to the material. Generally it relates to a system wherein variations in the measured property are manifested by variations in the phase shift of a detected signal from the probe. More particularly it relates to a system in which said phase shift variations are counteracted by opposite phase shift variations produced by automatically varying the frequency of the input signal, whereby the frequency may be correlated with the value of the measured property.

While dielectric gauging apparatus according to the invention is adapted for quantitative measurement of at least one property of any one of a number of dielectric materials having appreciable conductivity in relation to their electric susceptibility, the invention is particularly directed to a moisture gauge for measuring solid materials having a variable mass per unit length, area or volume. In this application a gauge according to the invention is adapted to provide an indication of percentage moisture content which is substantially independent of mass variations.

It has been previously known to measure the moisture content of such materials by transporting the material past a capacitive probe and measuring the phase shift of a detected signal from the probe relative to an alternating current signal applied to the probe. It was found that if the effect of the transfer admittance of the "empty" probe on the detected signals is balanced out somewhere in the system, and if the phase shift of the detected signal is measured independently of the amplitudes of the detected and applied signals, the phase shift so measured provides a reliable, quantitative indication of percentage moisture content which is substantially unaffected by mass variations in the material.

An instrument which measures phase shift at a single frequency can provide highly sensitive and stable measurements, but this is possible only over a rather limited range of moisture contents. Maximum stability and sensitivity obtain when the phase angle of the current through the probe is in the vicinity of 45° with respect to the applied voltage, that is, where the in-phase current associated with the conductivity of the material is nearly equal to the quadrature current associated with the susceptibility of the material.

At a given frequency, optimum phase-shift moisture measuring conditions prevail over a range of a few percent moisture content. However, with departures from the optimum range in the direction of either higher or lower moisture contents, unless the circuitry of the instrument can meet ultra-stringent requirements, the quality of the measurements progressively deteriorates. This occurs as the instrument becomes subject to errors caused by slight phase and amplitude instabilities in the balancing circuitry and the phase-measuring circuitry.

In a phase-shift moisture gauge, the mechanical structure is preferably arranged to maintain good physical contact between the probe electrodes and the material, such as a traveling paper sheet to be measured. If a perfect electrical connection to the material could be made, from terminal measurements with the effect of the "empty" probe balanced out, the material apparently would simulate a network of resistance and capacitance wherein the entire resistance and the entire capacitance would vary linearly and in the same proportion with variations in the mass of the material, e.g., the mass per unit area or "basis weight" of paper. Thus while the amplitude of the detected signal would vary in proportion to the mass, the phase shift would provide a measurement entirely independent of mass.

However, even with the best possible electrode contact, there exists a coupling capacitance between the material and the electrodes. From the standpoint of terminal measurements, this simulates a capacitor, in series with the probe and the paper circuit, which apparently does not vary in the same proportional manner with changes in the mass of the material, if in fact it is affected at all by mass variations. Hence, although the effect of the capacitance of the empty probe is balanced out, the probe with the material present actually simulates a network of resistance and capacitance wherein the entire resistance varies linearly with mass variations but wherein a portion of the capacitance does not vary linearly with mass variations. This results in a systematic error in the phase-shift moisture measurements.

While the systematic error can be calibrated out for any nominal value of the mass variable, and is relatively small in the normally expected range of deviation from the nominal value, it is of course desirable to minimize any and all sources of error wherever possible. Experimental and analytical evidence indicates that the systematic error due to the coupling capacitance is minimized when the ratio of the in-phase current to the quadrature current through the probe is about 0.9. It thus appears that maximum independence of mass variations, as well as maximum sensitivity and stability, is obtained when a phase-shift moisture gauge is operated at a frequency such that the measured phase shift is in the vicinity of 45°. The present invention is adapted to maintain these desirable conditions in a fully automatic manner.

In the measurement of moisture content in solid materials, the expected variation in percentage moisture generally exceeds the range in which a single-frequency phase-shift moisture gauge can be operated under optimum conditions. For this reason, it has been proposed to provide so-called range-switching gauges wherein a plurality of operating frequencies are made available and selectable by switching. However, during operation of a paper making machine, for example, the moisture content may change considerably and rapidly during a given production run, frequently shifting back and forth between two or more of the established ranges of measurement. Where only manual switching is provided, close attention on the part of a human operator is needed to see that all required range changes are made correctly and at the proper time, if complete and accurate measurements are desired. Since the operator cannot ordinarily give the instrument such close supervision, automatic range switching provisions are almost indispensable. However, this requires the addition of other complicated equipment to the system, at additional cost, and at the expense of increased maintenance and decreased reliability. Range switching in the measuring instrument also generally makes necessary range switching provisions in associated equipment, such as automatic process control systems and computers which utilize signals from the instrument. Where automatic recording equipment such as a strip-chart recorder is used, additional provisions are generally necessary to identify on the record the particular range of measurement in use at a given time.

Many of the foregoing difficulties with previous dielectric gauging systems can be eliminated or mitigated by the system of the present invention, which automatically maintains near-optimum conditions with respect to several operating parameters. It has additional advantages in that the logarithm of the operating frequency is a substantially linear function of a measured variable such as percentage moisture content, in that it inherently operates as a servo system with a substantially constant and maximum loop gain, and in that it provides more nearly constant-amplitude signals from the probe for handling by the detector and phase measuring circuitry.

The objects of the present invention are to provide a dielectric gauging system with an extended range of measurement, to provide a phase-shift gauging system with increased independence of mass variations in the material, to provide a system which is less subject to error due to phase and amplitude instabilities in the probe-balance circuitry, to provide a system which is less subject to error due to phase and amplitude instabilities in the phase measuring circuitry, to provide a system whereby the requirement for range switching is eliminated in many applications, to provide a phase-shift gauging system in which there is a linear relationship between the measured variable and the logarithm of the operating frequency, to provide a phase-shift dielectric materials gauge which is inherently a servo system with a high and substantially constant loop gain so as to provide both rapid response and good stability, and to provide a system wherein the dynamic range of signal amplitudes from the probe circuit is reduced so that the detector amplifier and other circuitry can be operated with good sensitivity at the lower amplitudes without clipping or distortion at the higher amplitudes.

Further objects and advantages of the present invention will become apparent in the following detailed description of certain specific and exemplary embodiments of the invention, taken in conjunction with the appended drawings in which.

Figure 1:
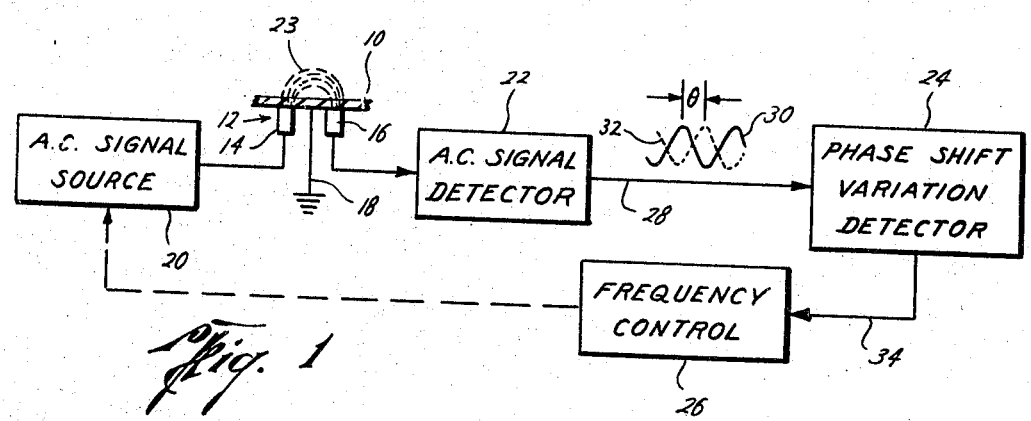
FIG. 1 is a simplified block diagram of a dielectric materials gauging system according to the invention.
Figure 2:
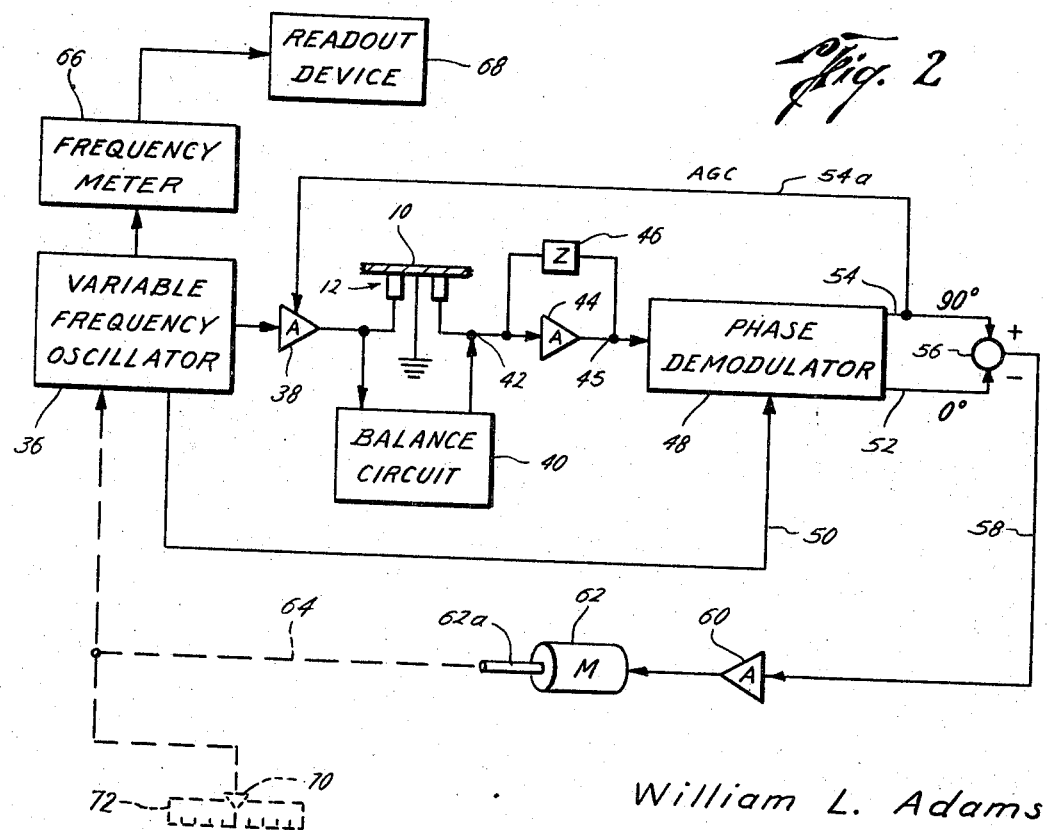
FIG. 2 is a schematic diagram showing in more detail a specific system for gauging dielectric materials according to the invention.
Figure 4:
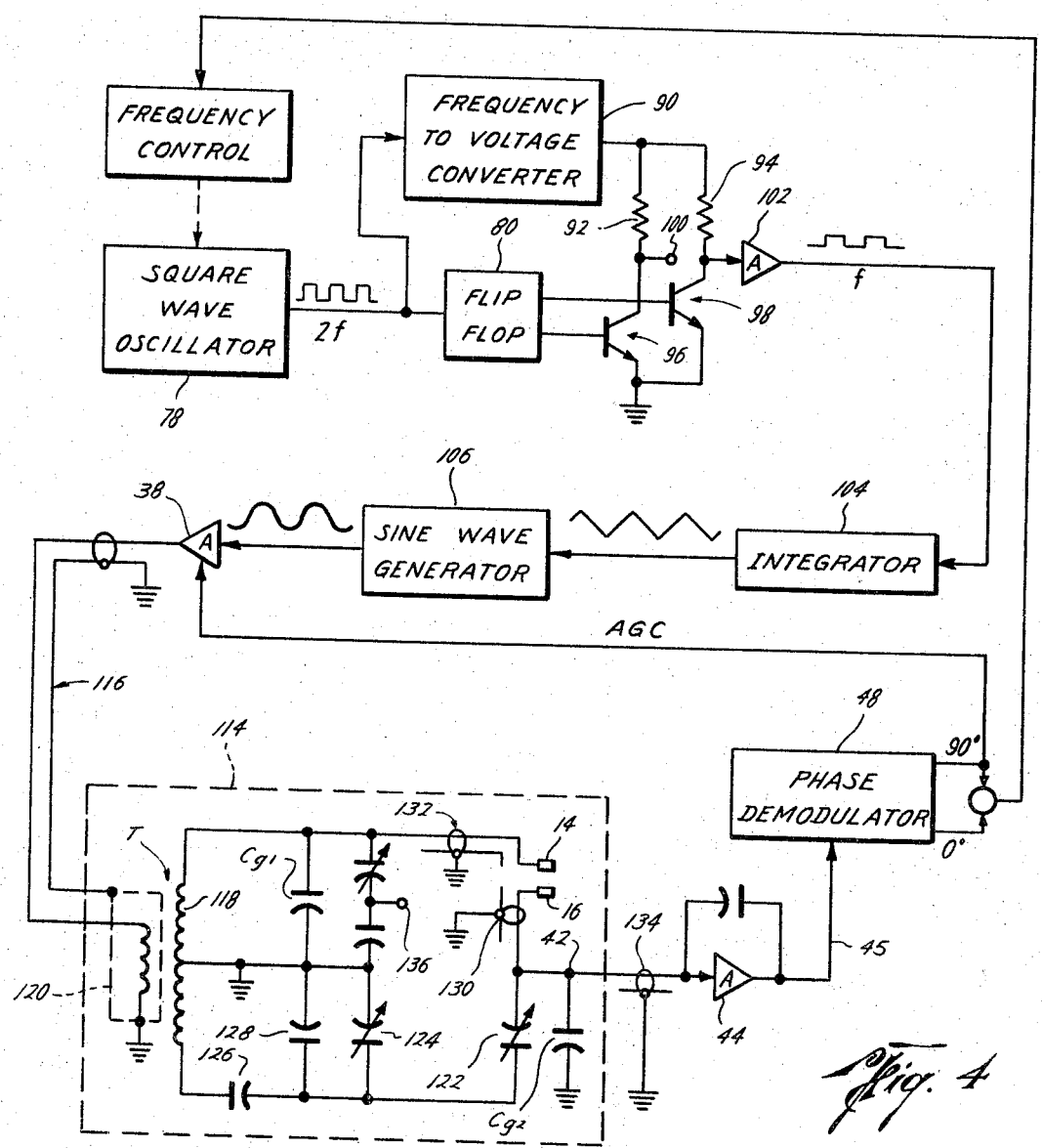
Figure 5:
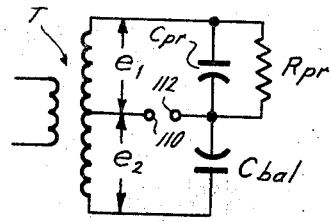

FIG. 3 a schematic diagram of a system in accordance with FIG. 1 or FIG. 2, showing in more detail one preferred arrangement of the oscillator and phase demodulator circuits;

FIG. 4 is a partly detailed schematic diagram of a system in accordance with FIG. 1 or FIG. 2, showing in more detail one preferred arrangement of the probe driver and broadband balance circuits employed in implementing the present invention;

FIG. 5 is a sketch of an elementary bridge circuit as an aid to the explanation of FIG. 4;

FIG. 6 is a circuit diagram of one form of the summing device 56 of FIGS. 2–4 which is used when it is desired to provide range switching in a gauging instrument according to the invention by selection of the operating phase; and FIG. 7 is a typical semi-logarithmic plot of the operating frequency as a function of percent moisture in paper and the like measured by an instrument having a range switching arrangement as in FIG. 6.

With reference to FIG. 1, the numeral 10 indicates a dielectric material having a variable property to be measured. It may be assumed that the material 10 is the output product of a continuous manufacturing process for forming the material in a continuous length which passes adjacent to a probe 12. Probe 12 comprises a pair of spaced electrodes 14 and 16, which are normally arranged on the same side of the traveling material 10 and with a grounded guard electrode 18 between the principal probe electrodes 14 and 16. The electrodes are supported by a suitable mechanical structure (not shown) whereby the probe electrodes are maintained in physical contact with the material 10 using a light pressure so as to avoid physical damage to the material.

The probe 12 is energized with an alternating current input signal from a signal source 20 such as an oscillator for providing a radio frequency voltage. The probe is also connected to an alternating current signal detector 22 such as a suitable amplifier. As illustrated, the probe electrode 14 is connected to the signal source 20 and the electrode 16 is connected to the detector 22. As a result of the input signal applied to the probe from source 20, the probe is adapted to produce an electric field between the electrodes comprising electric field lines 23 extending from one electrode to the other through the material 10. Thus the material 10 is electrically coupled to the source 20 and the detector 22.

The output of detector 22 is connected to a phase-shift variation detector 24. The output of the phase-shift variation detector is connected to a frequency control device 26. Device 26 is adapted to control the frequency of the input signal source 20.

The operation of the system of FIG. 1 is typically outlined as follows. Source 20 applies a voltage, alternating at a radio frequency, to probe 12. The applied voltage produces a complex current through the probe. One component of this complex current is in phase with the applied voltage and is associated with the macroscopic conductivity of the material. The other component of the current through the probe is in quadrature with the applied voltage and is associated with the macroscopic susceptibility of the material.

The current through the probe constitutes an alternating current signal which is detected by detector 22. The detector produces an output signal, on signal line 28, which is typically a voltage alternating at the frequency of the signal source 20. Such a signal is represented by the solid-line waveform 30.

Shown for reference is a further dotted-line waveform 32 which may represent the input voltage from source 20 which energizes the probe 12. The detector output waveform 30 is shown to exhibit a phase shift $\theta$ representing the phase angle between the input signal and the detected signal. The phase shift $\theta$ is dependent on the relative magnitudes of the in-phase and quadrature components of the current through the probe 12. As is disclosed in a copending application Ser. No. 352,482, filed Mar. 17, 1964 by Alan Norwich for "Moisture Measuring System," when properly measured the phase shift $\theta$ can provide a quantitative indication of a dielectric material property independently of changes in the mass per unit length, area or volume of the material 10. For example, the phase shift measurement can provide an indication of percentage moisture content in the paper produced by a paper making machine, and this indication is substantially independent of changes in the weight per unit area or "basis weight" of the paper.

According to this invention, instead of operating the input signal source 20 at a fixed frequency and measuring the phase shift θ, the output of the detector 22 is fed into the phase-shift variation detector 24, which is adapted to provide a feedback signal on line 34 in response to variations in the phase shift θ. This feedback signal is applied to the frequency control device 26, which is adapted to control the operating frequency of the input signal source 20 in response to the feedback signal.

In the preferred form of the invention particularly illustrated and described herein, the phase shift variation detector 24 and frequency control device 26 are arranged so that when the phase shift θ has a predetermined value such as 45°, the feedback signal on line 34 approaches zero. When θ deviates from the 45° value, the signal on line 34 will have an amplitude proportional to the amount of the deviation and a direction, that is, a polarity or phase, dependent on the direction in which θ deviates from 45°. In response to this signal, the frequency control system will either increase or decrease the operating frequency of the input signal source 20, whichever is required to counteract the change in the phase shift θ which causes the deviation signal to appear.

In the form of the invention particularly described herein, the apparatus comprises a feedback system which is adapted to maintain the phase shift θ substantially constant at the selected value of 45°. This form of the invention is referred to as a "constant phase system." In some instruments, however, a change in the phase shift θ as a result of changes in the dielectric material being measured may be only partially eliminated by a change in the operating frequency of the input signal source. Such instruments, which allow predetermined degrees of phase shift change to occur as a function of frequency, have been referred to as "hybrid systems." These hybrid systems are described and claimed in a copending application Ser. No. 563,466, filed July 7, 1966, by Henry T. Jaggers and Michael P. Grant.

One preferred form of the constant phase measuring system is shown in FIG. 2. A variable frequency oscillator 36 feeds the input of a probe driver amplifier 38. The output of amplifier 38 applies an energizing voltage to the probe 12 and also to a balance circuit 40. The current through the probe which is produced by this applied voltage causes a current to flow into a junction point 42 at the input of a detector amplifier 44. Junction point 42 also receives a generally oppositely-directed current supplied by balancing circuit 40. Junction 42 is further coupled to the output of the detector amplifier 44 through a feedback impedance 46.

This circuit is initially balanced by withdrawing the probe 12 from the vicinity of the measured material 10 and adjusting balancing circuit 40 so that the current supplied to junction point 42 through balancing circuit 40 is exactly equal to and 180° out of phase with the current supplied to the junction point through the probe 12. This balanced condition is indicated by zero output from amplifier 44. When the probe is again placed next to the material 10, the current through the probe exhibits an increase in amplitude and a change in phase, so that it is no longer equal and opposite to the current supplied through balancing circuit 40. This tends to produce a change in potential at the junction point 42, resulting in an input signal to amplifier 44. As a result the feedback amplifier 44 instantaneously supplies through impedance 46 a current which is equal and opposite to the difference between the currents supplied through the probe and through the balancing circuit, so that the net current supplied to junction 42 is substantially zero, thus maintaining the junction point at substantially constant potential.

The voltage required to produce the summation current through feedback impedance 46 constitutes the output signal from the detector amplifier 44. This signal is fed to the input of a phase demodulator 48. Phase demodulator 48 also receives a reference voltage from oscillator 36 via line 50.

The purpose of the phase demodulator 48 is to provide separate signals at its two outputs 52 and 54 which are proportional respectively to the real and imaginary components of the unbalance signals from the probe circuit. The signal on line 52 bearing the adjacent notation 0° is proportional to the amplitude of the unbalance signal from the probe circuit which is in phase with the voltage applied to the probe. Likewise the signal on line 54 having the adjacent notation 90° has an amplitude proportional to the unbalance signal from the probe circuit which is in quadrature or 90° out of phase with the voltage applied to the probe.

The phase demodulator 48 includes suitable rectifier and filter circuits, so that the signals on lines 52 and 54 are substantially D.C. signals derived with opposite polarity as indicated on the drawing.

The signal on line 54 is fed back via line 54a to provide an automatic gain control (AGC) signal to the probe driver amplifier 38. The magnitude of the current through the probe 12 is affected by several variables in addition to the complex dielectric constant of the material 10 which can be correlated with an unknown property such as percentage moisture content to be measured. The two principal extraneous variables are the mass of the material and the goodness of the electrical contact of the probe electrodes with the material. An increase in the mass of the material obviously decreases the resistance of the electrical path between the probe electrodes for about the same reason that a large conductor has less resistance than a small conductor. Likewise an increase in the mass introduces more material to be polarized by the electric field between the probe electrodes and thus increases the capacitance of the probe. A poor physical contact between the material and the probe electrodes obviously increases the impedance of the probe circuit. Additionally such poor contact is associated with an increase in the effective spacing between the material and the electrodes, thus also increasing the capacitive reactance of the probe.

With a constant voltage applied to the probe, these extraneous variables generally coact with the variations in the complex dielectric constant of the material to produce wide variations in the amplitudes of the signals derived from the probe. The would severely tax the capabilities of the detector amplifier 44 for faithful reproduction of the input waveform. If the amplifier were to be provided with sufficient sensitivity to amplify signals of very small amplitudes, large-amplitude signals would have a tendency to overdrive the amplifier and cause clipping of the waveform, thus producing an effect practically indistinguishable from a phase shift. In a similar manner, an ordinary phase demodulator is subject to inaccuracies due to changes in both the absolute and relative amplitudes of the signal and reference voltages fed thereto. It is thus apparent that several difficulties are avoided by providing automatic gain control for the probe driver amplifier 38 in a manner such that the signal on line 54 is maintained at a relatively constant amplitude.

The two signals on lines 52 and 54, which have opposite polarities as explained above, are fed to a summing device 56. The output of the summing device is a D.C. signal whose polarity is that of the larger of the two signals on lines 52 and 54 and whose amplitude is equal to the absolute difference of said signals. The output of the summing device is utilized as an error signal which is fed over line 58 to the input of a servo amplifier 60. The output of the servo amplifier drives a servo motor 62. The motor shaft 62a is coupled, through a mechanical connection represented by the dashed line 64, to a frequency-varying element (not shown) in the oscillator 36 which provides the input signal to the system. The rotation of the motor shaft increases or decreases the frequency of oscillator 36, depending on the direction of the shaft rotation.

In order to provide a readout of the quantitative value of the property being measured, the oscillator is connected to a frequency meter circuit 66. The frequency meter circuit provides an output voltage which is fed to a readout device 68. The readout device is suitably calibrated to provide a quantitative indication of the dielectric material property being measured.

As an alternate form of readout device, the servo motor shaft 62a may be arranged to drive an indicator 70 which cooperates with an associated scale 72 shown in dotted lines. This alternative arrangement presumes a predetermined and constant relationship between the position of the frequency-varying element and the oscillator frequency. Whichever form of readout indication is used, it is designed to take into account the fact that it is the logarithm of the operating frequency which is proportional to the measured variable, such as percentage moisture content in a sheet of paper. However, the linearization which may be required is generally easier to implement than the usual non-linear conversions which are characteristically required in conventional dielectric materials gauging instruments. For many applications, the simple provision of a logarithmic scale on the instrument, after the manner of a conventional slide rule, is satisfactory.

Typically the system of FIG. 2 is used to measure the percentage moisture content of a traveling paper sheet issuing continuously from a paper making machine. In this application, when the percentage moisture in the paper increases, the servo system operates to increase the frequency of the oscillator 36. Conversely, when the percentage moisture decreases, the servo system effects a decrease in the frequency of the oscillator. Assuming that both the real and imaginary components of the detected signal from the probe circuit have the same gain through the system, the phase-demodulated signal at 0° will have the same amplitude as the signal which is phase demodulated at 90°, and accordingly the phase with θ maintained automatically by the servo is 45°.

A preferred form of the phase demodulator 48 is outlined in more detail in FIG. 3. This arrangement includes a pair of phase-sensitive demodulators 74 and 76 of a known type which employs high-speed electronic switching circuits to provide synchronous demodulation of the amplified unbalance signal delivered at the output of the detetcor amplifier 44 on line 45. The demodulators 74 and 76 need to be supplied with phase-reference signals which are accurately phased both with respect to each other and with respect to the input signal which energizes the probe circuit. These reference signals must also be adapted to provide accurate timing of the high-speed switching circuits in the synchronous demodulators 74 and 76 in such a way that the system will function with substantial independence of the operating frequency over a wide range.

To this end, there is provided an oscillator 78 of the multivibrator type which generates square waves at twice the frequency of the output signal supplied to the probe driver amplifier 38. Accordingly the output of oscillator 78 having the frequency 2f is supplied to the input of a flip-flop 80. As indicated by the plus sign at the input side of the box 80, flip-flop 80 is triggered to change its binary state when its input signal is positive-going. Flip-flop 80 functions as a 2:1 frequency divider to supply at its output a square wave having the frequency f, which is applied as an input to the probe-driver amplifier 38.

The double-frequency output of oscillator 78 is also applied to the input of another flip-flop 82 which also changes its binary state when its input signal is positive-going. Flip-flop 82 also functions as a 2:1 frequency divider to supply at its output a square wave at the frequency f, which is fed via line 83 to the reference signal input of the phase-sensitive demodulator 76. The signals delivered by flip-flops 80 and 82 are obtained from the corresponding outputs of the flip-flops identified for reference as binary 0 outputs so that the two waveforms will be in phase. The complementary binary 1 outputs may be utilized in a conventional circuit (not shown) for automatically synchronizing the two flip-flops in case they get out of step due to a power interruption or extraneous pulses arising somewhere in the system.

The output of oscillator 78 is further applied to a third flip-flop 84 which is triggered to change its binary state when its input signal is negative-going. In other respects flip-flop 84 is like flip-flop 80 and 82 and sychronized therewith. Flip-flop 84 provides an output square wave at the frequency f which is exactly 90° out of phase with the signals delivered by flip-flop 80 and 82. Flip-flop 84 thus delivers via line 86 a phase-reference signal to the phase-sensitive demodulator 74. The outputs 52 and 54 correspond to outputs 52 and 54 in FIG. 2, and are shown connected to the summing device 56 of FIG. 2.

If sufficiently rigid design specifications can be adhered to, the probe and balance circuits can be energized with a square wave voltage as shown in FIG. 2. It is thus possible to depend on the phase demodulation system to substantially eliminate the effect of the undesired harmonic frequencies contained in the input signals which drive the probe circuit. However, where substantial non-linearities exist in a system, it becomes necessary to provide a substantially sinewave input voltage. One system for performing this function is illustrated in FIG. 4.

Here the double-frequency square-wave output of oscillator 78 is applied to a frequency-to-voltage converter 90. The output of converter 90 is a suitably filtered D.C. voltage directly proportional to the frequency of oscillator 78. This voltage is applied through a pair of load resistors 92 and 94 to a pair of transistor switches 96 and 98 controlled by flip-flop 80. This circuit provides a square-wave voltage at the frequency f whose amplitude is directly proportional to the frequency. One may use a single-ended output as shown, or a double-ended output is available if terminal 100 is also used. This signal is amplified if necessary by an amplifier 102. The waveform so provided has a constant area under the pulses which constitute the square wave.

The voltage output provided by this arrangement is applied to the input of an integrator 104 which provides a triangular-wave voltage having a constant amplitude regardless of frequency. The triangular wave voltage energizes a conventional sinewave generator which may comprise suitable diode clipper circuits such as those used in commercial function generators. The sine wave output of generator 106 provides the input to the probe driver amplifier 38 as shown in FIG. 2.

With reference again to FIG. 2, as previously explained the purpose of the balance circuit 40 is to subtract out from the signal derived from the probe 12 the component of the signal obtained from the probe in the absence of the material 10. Some form of probe balance is essential in an instrument which is to measure a dielectric property independently of changes in the mass of the material.

In the apparatus of FIG. 2, the subtraction is caused to take place at the input of detector amplifier 44, by suppling to the input junction 42 a current equal and opposite to that which flows through the probe 12 with the material absent.

It is not essential that probe balance be effected at this point, since the necessary compensation could be made at any one of several different points in the system. For example, instead of supplying the balancing current to junction point 42, a balancing circuit could be arranged to supply a suitable balancing voltage to a summing point at the output 45 of the detector amplifier. This would be more difficult to achieve, however, since it is essential that the balance-signal channel have the same gain and phase shift characteristics as the probe-signal channel. Even more difficulty might be encountered in effecting balance at other points in the system such as the phase demodulator or the servo arrangement. Hence the most practical place for applying the balance technique is at the probe itself, particularly in the system of the invention wherein the input signal is continuously varied in frequency over a wide range.

One form of broadband balancing arrangement suitable for use in the system of the present invention is described in a copending application Ser. No. 268,268, filed Mar. 27, 1963 by Alan Norwich, now Patent No. 3,290,-588. In the Norwich system, probe balance is achieved by driving either the probe or a balancing impedance with a feedback amplifier which effects a 180° phase shift between the currents derived from the probe and the balance circuits.

Another preferred arrangement for achieving broadband balance with passive circuit elements employs a capacitor bridge of the form shown in FIG. 5. Here $C_{pr}$ represents the capacitance between probe electrodes 14 and 16 of FIG. 1. $C_{bal}$ represents a balancing capacitor. The probe and balancing capacitances are connected in series across the center-tapped secondary winding of a transformer T. The transformer secondary winding provides oppositely phased voltage $e_1$ and $e_2$ with respect to its center tap 110. The output of the bridge when it is unbalanced is taken between the center tap 110 and the junction 112 of the probe and balancing capacitors. $R_{pr}$ represents the leakage resistance of the probe capacitor. In the range of frequencies employed in the system, the impedance of $C_{pr}$ is several orders of magnitude smaller than the leakage resistance, and hence the leakage resistance has no practical effect on the balance of the bridge.

A practical arrangement of the circuit is shown in FIG. 4. Here the dotted-line enclosure 114 represents a gauging head, for example a gauging head of the type which is adapted to measure the moisture content of a traveling sheet of paper. Conventionally the gauging head 114 is mounted on a suitable supporting structure which permits the gauging head to be traversed back and forth across the width of the traveling paper sheet. To avoid the problem of differential phase shift effects of interconnecting cables, the entire capacitor bridge circuit including the transformer T is mounted in the gauging head and supplied with the radiofrequency voltage from the probe driver amplifier 38 through a coaxial cable 116.

To avoid differential effects with frequency, both halves of the transformer secondary winding 118 must have equal capacitance to ground. Accordingly the transformer must be suitably shielded, as shown by the dashed line 120. The original version of this circuit utilized a suitably modified General Radio 578–C bridge transformer, which was found to have appropriate shielding and acceptable frequency characteristics. To convert this unit to a center tapped arrangement, the outer secondary windings were stripped off, to leave only the first layer remaining, and this remaining winding was center tapped. This unit easily met the design requirements over the frequency range from 1 kilocycle to 500 kilocycles per second, so that it appears that a transformer specially designed for this application will permit the capacitive bridge balancing arrangement to be used in instruments for measuring percentage moisture content over the ranges normally encountered in practical applications.

In the bridge circuit shown in FIG. 4 the numerals 14 and 16 are again used to indicate the probe electrodes. The balancing capacitor is indicated by the numeral 122 and is adjustable to provide a course bridge balance. A fine adjustment for bridge balance is provided by an adjustable capacitor 124 forming part of a voltage divider arrangement which includes capacitors 126 and 128. $C_{g1}$ represents the capacitance between the probe electrode 14 and the grounded guard electrode 18 shown in FIG. 1. The capacitance between the guard electrode 18 and the probe electrode 16 is represented by the capacitor $C_{g2}$ which shunts the junction point 42 between the probe and the balancing capacitor to ground at the input of detector amplifier 44. The probe is connected to the capacitance bridge through short coaxial cables 130 and 132 which permit some relative movement between the probe and the gauging head. Thus a suitable lift-off mechanism may be used to lift the probe clear of the sheet being measured when the gauging head 114 is driven on and off of the sheet at one edge thereof to permit automatic standardization of the instrument or to facilitate threading of the paper making machine which produces the paper. The unbalance signal derived from the probe circuit is fed to detector amplifier 44 through a coaxial cable 134.

As shown, a capacitance divider is used to supply a 0° reference signal to a terminal 136. The signal so derived may be adjusted by means of the capacitance divider to have a magnitude and impedance level comparable to the signal obtained from the probe, and may be utilized for test purposes. It is apparent that this signal could also be used to provide suitably timed phase-reference signals to the phase-sensitive demodulators 74 and 76 in place of the signals derived from the double-frequency square-wave oscillator and flip-flop gate arrangement.

For this purpose, the reference signal from the bridge could be applied, with or without amplification, to a suitable frequency doubler comprising a full-wave rectifier using low-capacitance, high-speed switching diodes. In this way, the 0° and 90° reference signals could be generated in an alternate manner. While the present description has illustrated the use of a double frequency, it is apparent that other harmonic frequencies could be used in suitable demodulator circuits using reference signals at other phase angles.

While the bridge circuit diagram of FIG. 4 bears a close resemblance to the circuit diagrams of prior arrangements such as that disclosed in a copending application Ser. No. 181,341, filed Mar. 21, 1962 by Frederick L. Maltby et al., now abandoned, see British Patent 1,063,-515, the present apparatus is different by virtue of the special arrangements for achieving frequency-independent balance and in that the entire arrangement is physically mounted in the gauging head 114 to avoid differential frequency effects due to the cabling which connects the probe into the capacitor bridge.

For any constant value of moisture content or other property which can be measured as a function of the complex dielectric constant of the material, the phase shift is determined by the operating frequency. Conversely, if the operating phase shift parameter in a constant phase system is assigned some fixed value such as the near-optimum value of 45°, the required operating frequency is determined by the value of the measured property. Likewise, with a fixed phase shift the required operating frequency range is determined by the amount of variation which will occur in the value of the measured property. Where extremely wide variations in moisture content, for example, must be measured, a restriction to a single fixed value for the phase shift parameter imposes the requirement that the oscillator and other circuits of the instrument be adapted for operation over a very wide range of frequencies. In cases where it is preferable to utilize conventional oscillators and other circuitry which is adapted for operation only over a modest frequency range, a form of range switching is readily made available by providing a selection of two or more values for the phase shift parameter. One simple device for this purpose is illustrated in FIG. 6.

FIG. 6 shows a modification of the summing device 56 as used, for example, in the system of FIG. 2. Here three variable potentiometers 140, 142 and 144 are connected in series between lines 52 and 54 which constitute the two outputs of the phase demodulator 48. The variable taps of these potentiometers are connected to the fixed contacts of a selector switch 146, whose variable contact 146a is connected to the input of the servo amplifier 60 (FIG. 2) via line 58. Since the frequency control servomechanism operates to maintain the voltage (error signal) on line 58 near zero, the voltage between the selected potentiometer tap and line 54 is maintained substantially equal in magnitude to the voltage between the selected tap and line 52. In the example shown, the potentiometers 140, 142 and 144 are adjusted so that the switch settings provide a selection of 75°, 45° and 25° phase angles to be maintained constant by the feedback system.

FIG. 7 is a plot of the operating frequency as a function of the percent moisture in paper. The frequency $f$ is measured on a logarithmic scale. The three selected values, 25°, 45° and 75°, of the phase shift parameter, provide three overlapping ranges for percent moisture measurement in low, intermediate and high moisture regions, and each range is substantially linear in the usable portion thereof as shown.

What is claimed is:

1. Apparatus for quantitative determination of a variable property of a dielectric material, comprising:
   a source of an alternating current input signal,
   means for varying the operating frequency of said signal source,
   an alternating current signal detector having an input and an output,
   a probe having a pair of spaced electrodes adapted for electrically coupling a portion of said material to said signal source and to said detector input, said probe producing electric field lines extending from one of said pair of electrodes through the material to the other electrode, said coupling energizing said detector to produce an output signal at said detector output with a phase shift relative to said input signal coupled to said material by said probe,
   means responsive to variations in the amount of said phase shift caused by variations in the dielectric properties of said material for energizing said signal source frequency varying means to produce changes in the operating frequency of said input signal source, said frequency changes being in such a direction as to produce phase shift variations in said detector output signal which are opposed to said variations caused by changes in the dielectric properties of said material, and
   means for converting said operating frequency to a signal indicative of the value of said variable property of said dielectric material substantially independent of its mass.

2. Apparatus as in claim 1 wherein said converting means comprises means responsive to said operating frequency of said input signal source.

3. Apparatus as in claim 1 wherein said converting means comprises means responsive to said frequency varying means.

4. Apparatus as in claim 3 wherein said frequency varying means comprises a servomechanism including a mechanically movable frequency determining element, and means responsive to the position of said movable element for producing said variable property indicative signal.

5. Apparatus for quantitative determination of a variable property of a dielectric material, comprising:
   a source of an alternating current signal,
   means for varying the frequency of said signal source,
   detecting means,
   a probe having spaced electrodes adapted for electrically coupling a portion of said material to said signal source and to said detecting means, thereby energizing said detecting means to produce a detector output signal with a phase dependent on the complex dielectric constant of said material portion,
   means energized by said input signal source for producing a reference signal having a phase independent of the electrical properties of said material portion, and
   means responsive to the phase relationship between said detector output signal and said reference signal in a manner substantially independent of the amplitude of said detector output signal for energizing said input signal source varying means to alter the frequency of said source so as to maintain said phase relationship substantially constant.

6. Apparatus as in claim 5 including means for converting the frequency of said input signal source to a signal indicative of the value of said variable property of said dielectric material substantially independent of its mass.

7. Apparatus for quantitative determination of a variable property of a dielectric material, comprising:
   a source of an alternating current input voltage,
   means for varying the frequency of said voltage source,
   detecting means,
   a probe having spaced electrodes adapted for electrically coupling a portion of said material to said voltage source and to said detecting means thereby energizing said detecting means to produce an output signal indicative of the complex current through said probe as a result of said input voltage coupled thereto, said output signal having a first component responsive to a portion of said complex current which is in phase with said input voltage and a second component responsive to a portion of said complex current which is out of phase with said input voltage,
   means responsive to relative changes in said first component with respect to said second component caused by variations in the dielectric properties of said material for activating said frequency varying means to produce changes in the operating frequency of said input voltage source, said frequency changes being in such a direction as to produce changes counteracting said relative changes in said components, and
   means for converting said operating frequency to a signal indicative of the value of said variable property of said dielectric material substantially independent of its mass.

8. Apparatus as in claim 7 including means responsive to the amplitude of one of said first and second output signal components for maintaining the amplitude of said one component substantially constant.

9. Apparatus for quantitative determination of a variable property of a dielectric material, comprising:
   a source of an alternating current input voltage,
   means for varying the operating frequency of said input voltage source,
   detecting means,
   a probe having spaced electrodes for electrically coupling a portion of said material to said voltage source and to said detecting means, thereby energizing said detecting means to produce a detector output in response to the complex current through said probe as a result of said input voltage coupled thereto,
   means responsive to said detector output signal for producing a composite signal having a first component responsive to a first portion of said complex current which is in phase with said input voltage and a second component responsive to a second portion of said complex current which is out of phase with said input voltage,
   means substantially independent of said operating frequency for substantially eliminating from one of said composite signal components the portion thereof which would otherwise be present due to current through said probe in the absence of said material at the probe, and
   means responsive to relative changes in said first component with respect to said second component caused by variations in said material in the presence thereof at said probe for activating said frequency varying means to produce changes in the operating frequency of said input voltage source, said frequency changes being in such a direction as to oppose said relative change in said components caused by said material variations.

10. Apparatus as in claim 9 wherein said frequency independent signal component portion eliminating means comprises a capacitance bridge circuit with said probe electrodes forming one arm thereof,
wherein said detecting means includes an input circuit responsive to unbalance of said bridge circuit, and
wherein said bridge circuit includes means for balancing the bridge in the absence of said material at said probe so that the balance is substantially unaffected by the changes in said operating frequency effected by said frequency varying means.

11. Apparatus as in claim 10 wherein said capacitance bridge includes a transformer adapted to provide two oppositely phased voltage with a phase difference therebetween which remains substantially constant with the changes in said operating frequency effected by said frequency varying means.

12. Apparatus as in claim 10 which includes,
a gauging head adapted to carry said probe and being movably mounted to permit traversing said material with the probe, and
wherein said capitance bridge includes,
a transformer mounted in said gauging head and being adapted to provide two oppositely phased voltages with a phase difference therebetween which remains substantially constant with the changes in said operating frequency effected by said frequency varying means.

13. Apparatus for quantitative determination of a variable property of a dielectric material, comprising.
a source of an alternating current input voltage,
means for varying the frequency of said voltage source,
detecting means,
a probe having spaced electrodes adapted for electrically coupling a portion of said material to said voltage source and to said detecting means, thereby energizing said detecting means to produce a detector output signal indicative of the complex current through said probe as a result of said input voltage coupled thereto,
means for producing a signal having a frequency which is a multiple of said voltage source frequency,
means receiving said detector output signal and said multiple-frequency signal for producing a first component signal responsive to a first portion of said complex current having a first phase relationship to said input voltage and a second component signal responsive to a second portion of said complex current having a different phase relationship to said input voltage,
means for comparing said component signals and for producing a feedback signal whenever the comparison indicates a departure from a predetermined relationship of said first component signal to said second component signal,
means responsive to said feedback signal for varying the frequency of said voltage source in the direction which tends to restore said predetermined relationship of said component signals, and
means for converting said voltage source frequency to a signal indicative of the value of said variable property of said dielectric materials.

14. Apparatus for quantitative determination of a variable property of a dielectric material utilizing a probe having spaced electrodes electrically coupled to the material and energized with an alternating voltage to produce a complex current through said probe, which comprises:
means responsive to said voltage and to said complex current for producing a phase indicator signal substantially independent of the amplitudes of said voltage and said current, said signal being indicative of the phase of said current with respect to said voltage, and
means responsive to changes in said phase indicator signal for changing the frequency of said voltage so as to reduce the magnitude of said changes in said phase indicator signal which would otherwise occur due to variations in said property.

15. The method of measuring a variable property of a dielectric material utilizing a probe having spaced electrodes electrically coupled to the material and energized with an alternating voltage, which comprises
detecting changes in the phase of the complex current through said probe with respect to said voltage,
changing the frequency of said voltage so as to reduce the magnitude of said phase changes which would otherwise occur due to variations in said property, and
producing a signal indicative of the value of said property as a function of the frequency of said voltage.

16. The method of claim 15 which includes the step of compensating said detected phase changes for the effect of the current through said probe in the absence of the measured material thereat.

17. The method of measuring a variable property of a dielectric material utilizing a probe having spaced electrodes resistively and capacitively coupled to the material and energized with an alternating voltage, which comprises
deriving a phase reference signal from said voltage,
detecting changes in the phase of the complex current through said probe with respect to said reference signal,
changing the frequency of said voltage when said phase changes are detected so as to maintain a substantially constant phase relationship between said probe current and said reference signal, and
producing a signal indicative of the value of said property as a function of the frequency of said voltage.

References Cited
UNITED STATES PATENTS

| | | | |
|---|---|---|---|
| 2,718,620 | 9/1955 | Howe | 324—61 |
| 2,985,825 | 5/1961 | Whittier | 324—60 |
| 3,115,603 | 12/1963 | Fluegel | 324—60 |
| 3,292,071 | 12/1966 | Sloughter | 324—40 XR |
| 3,300,716 | 1/1967 | Engert | 324—617 |

RUDOLPH V. ROLINEC, *Primary Examiner.*
E. E. KUBASIEWICZ, *Assistant Examiner.*

UNITED STATES PATENT OFFICE
CERTIFICATE OF CORRECTION

Patent No. 3,443,219         Dated May 6, 1969

Inventor(s) W. L. Adams

It is certified that error appears in the above-identified patent and that said Letters Patent are hereby corrected as shown below:

In the Specifications; column 4, lines 25 and 43, "radio frequency" should read as one word --radiofrequency--, column 7, line 40, "phase with θ" should read --phase shift θ--.

In the Claims; claim 5, column 11, line 63, "current signal" should read --current input signal--; claim 7, column 12, line 19, "means thereby" should read --means, thereby--.

In the References Cited; "3,292,071" should read --3,292,077--.

Signed and sealed this 4th day of May 1971.

(SEAL)
Attest:

EDWARD M. FLETCHER, JR.          WILLIAM E. SCHUYLER, JR.
Attesting Officer                Commissioner of Patents